United States Patent Office 3,549,593
Patented Dec. 22, 1970

3,549,593
AROMATIC POLYESTERS OF SUBSTITUTED HYDROXY BENZOIC ACIDS
Tohru Takekoshi, Schenectady, N.Y., assignor to General Electric Company, a corporation of New York
No Drawing. Filed Aug. 16, 1968, Ser. No. 753,076
Int. Cl. C08g *17/02*
U.S. Cl. 260—47                                    7 Claims

ABSTRACT OF THE DISCLOSURE

High molecular weight polyesters having a completely aromatic backbone are produced by the high temperature condensation of the monocarboxylic esters of substituted hydroxy benzoic acids. These polymers are high melting, crystalline materials which are useful in producing fibers, etc., and can be pressed into films, etc., for protective coatings and the like.

---

This invention is concerned with a method of producing high molecular weight polyesters having a completely aromatic backbone and to the products produced thereby. More particularly, this invention relates to a method of condensing the acyl derivatives of substituted hydroxy benzoic acids to yield high molecular weight polymers, and to the polymers and copolymers produced thereby.

Dimerization and oligomerization of salicylic acid is known. It is also known that para-hydroxy benzoic acid could be polymerized; however, high molecular weight polyesters of hydroxy benzoic acid were difficult to obtain. The relatively high molecular weight polyesters and copolyesters of meta- and para-hydroxy benzoic acids have been prepared. These polymers showed excellent fiber and film-forming properties; however, they have inferior hydrolytic stability. It has also been attempted to condense 2-acetoxy-4-acetaminobenzoic acid; however, only low molecular weight polymers of indefinite structure were obtained.

It has now been found that the alkyl and aryl substituted acetoxy benzoic acids can be condensed by the elimination of acetic acid to yield high molecular weight polyesters and copolyesters having a completely aromatic backbone chain.

In accordance with this invention, high molecular weight polymers having repeating units of the formula:

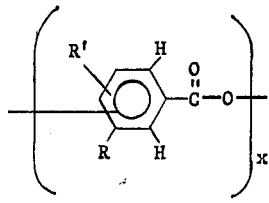

(I)

or

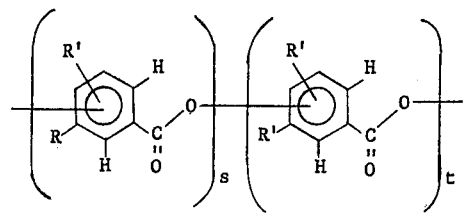

(II)

wherein R is a lower alkyl group; i.e., containing from 1 to 5 carbon atoms, or a lower aryl group, i.e., containing up to 10 carbon atoms, R' is a member of the class consisting of hydrogen, lower alkyl groups and lower aryl groups, $x$ is an integer of at least 10, and can be 10,000 or more, $s$ and $t$ are integers of at least 1 whose sum is at least 10 and can be 10,000 or more, and R and R' need not necessarily represent the same entity throughout the molecular chain, and compositions encompassed by Formula I and II would include the homopolymers wherein R represents the same entity throughout the molecule, and copolymers and terpolymers where R and R' need not necessarily represent the same entity.

In accordance with the process of this invention, a substituted hydroxy benzoic acid having the formula:

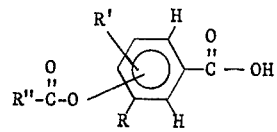

(III)

and from 0 to 99 mole percent of a benzoic acid having the formula:

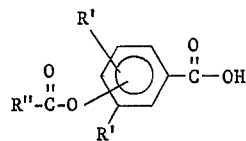

wherein R and R' are as above-defined, and R'' is a lower alkyl group, are placed in a suitable reaction vessel under an inert atmosphere, and heated to a temperature sufficiently elevated so as to cause the reaction of the substituted benzoic acid to yield a polymer or copolymer having repeating units of Formula I or II.

The temperature at which the process of this invention is conducted can range from about 180° C. to as high as 450° C. or higher. It is preferred that the process of this invention can be operated between 215° C. and 300° C. in an inert atmosphere or in a vacuum.

Although the process of this invention can be conducted employing heat alone to cause the condensation and elimination of the aliphatic carboxylic acid, it is preferred to employ a catalyst in the process of this invention. Catalysts which can be employed are the inorganic bases and their salts, for example, the alkali metal and alkaline earth metal hydroxides, oxides, carbonates, and salts of monocarboxylic acids containing 1 to 20 carbon atoms; magnesium metal, magnesium oxide, magnesium salts of carboxylic acids containing one to 20 carbon atoms, such as magnesium stearate, etc., sodium carbonate, sodium salts of carboxylic acids containing one to 20 carbon atoms, and the zinc metal, zinc salts of carboxylic acids containing one to 20 carbon atoms, for example, zinc acetate, zinc stearate; etc.

The process of the present invention is preferably conducted in an inert atmosphere such as, for example, under a blanket of nitrogen, argon, helium, krypton, or other inert gas, or under a vacuum. This is desirable since the high temperatures necessary in the process of this invention would cause oxidation of the materials if oxygen were allowed to be present in the reaction system.

Although a solvent is not necessary in conducting the process of this invention, a solvent can be employed if desired. Inasmuch as the process is conducted at high temperatures, the solvent employed must necessarily have a boiling point higher than that of the by-product monocarboxylic acid and must be a solvent in which the reactants and preferably the polyester products are at least partially soluble. Solvents which can be employed in the practice of this invention are, for example, diphenylether, etc., and halogenated aromatic compounds such as chlorinated biphenyl, etc.

By the term lower alkyl groups as employed herein is meant alkyl groups containing up to 5 carbon atoms. Illustrative of the lower alkyl groups which R, R' and R'' represent are, for example, methyl, ethyl, propyl, isopropyl, butyl, pentyl, isopentyl, etc.

By the term lower aryl group as employed herein is meant an aryl group containing up to 10 carbon atoms. Illustrative of the lower aryl groups which R and R' represent are, for example, phenyl, tolyl, xylyl, ethylphenyl, trimethylphenyl, etc.

Illustrative of the substituted hydroxy benzoic acid which can be employed as a monomer in the process of this invention are, for example, 3-acetoxy-4-methylbenzoic acid, 4-acetoxy-3-methylbenzoic acid, 4-acetoxy-3,5-dimethylbenzoic acid, 4-acetoxy-3-phenylbenzoic acid, 4-acetoxy-3,5-diphenylbenzoic acid, 4-propanoyloxy-3,5-ditolylbenzoic acid, 3-acetoxy-4,5-dimethylbenzoic acid, 4-butanoyloxy-3-methyl-5-phenylbenzoic acid, and the like.

The substituted hydroxy benzoic acids employed in this invention can be produced by classical organic synthesis methods such as the following:

(A) 4-acetoxy-3-methylbenzoic acid was prepared by converting 4-amino-3-methylbenzoic acid to the diazocompound, decomposition of the diazocompound with aqueous sulfuric acid and then acetylation employing acetic anhydride.

(B) 4-acetoxy-3-phenylbenzoic acid was prepared by the Friedel-Crafts acetylation of 2-methoxy-biphenyl to form 2-methoxy-4-acetyl biphenyl which was then oxidized via a hypochlorite oxidation to yield 4-methoxy-4-phenylbenzoic acid. The 4-methoxy-3-phenylbenzoic acid was demethylated with hydriodic acid and the product acetylated with acetic anhydride to yield 4-acetoxy-3-phenylbenzoic acid.

The homo- and copolymeric compositions of Formulas I and II have excellent fiber and film-forming properties and are electrical insulators. These compositions are therefore useful as capacitor dielectrics, as insulation for wires, as protective and decorative films, etc.

The following examples serve to further illustrate this invention. All parts are parts by weight unless otherwise especially set forth.

EXAMPLE 1

4-acetoxy-3-phenylbenzoic acid (5 parts) and magnesium metal (0.0006 part) were placed in a polymerization tube equipped with a gas inlet capillary and a side arm. Nitrogen was introduced through the capillary to the bottom of the tube and the tube was heated to approximately 220° C. to 230° C. At this temperature, the monomer melted and the magnesium chip dissolved in the mixture, and acetic acid began to distill out through the side arm. The heating was continued for approximately ½ hour, when the elimination of the acetic acid was almost complete. The heating was continued for an additional one-fourth hour, and the temperature gradually raised to 280° C. over an additional 20-minute period. The reaction system was then heated to 300° C. at 0.1 millimeter of mercury for ½ hour. A polymer having recurring units of the formula

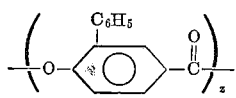

wherein $z$ is an integer of at least 10, was obtained as a white opaque solid having a melting point of 356 to 362° C. This polymer had an intrinsic viscosity of 0.30 deciliter per gram when measured in chlorinated orthophenylphenol at 150° C.

EXAMPLE 2

4-acetoxy-3-phenylbenzoic acid (3 parts) and magnesium stearate (0.0069 part) were placed in polymerization tube equipped with a gas inlet capillary and a side arm. The reactants were heated to melt at 235~245° under a blanket of nitrogen introduced through the capillary. As acetic acid distilled the melt gradually increased its viscosity and solidified in 50 minutes. The pressure of the system was gradually reduced to less than 1 mm. Hg. The temperature was then raised to 370° during the period of 20 minutes and this temperature was maintained for 10 minutes. Heating was terminated and the polymer was cooled under nitrogen. A polymer having the formula:

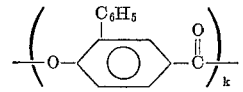

where $k$ is an integer of at least 10 was obtained.

The polymer was an amber-colored, tough crystalline solid and fibers could be drawn from the melt. The polymer was insoluble at ambient temperature in all organic solvents tested such as phenol, chlorophenol, cresol, dimethylsulfoxide, dimethylformamide, etc. The intrinsic viscosity of the polymer in chlorinated orthophenylphenol at 150° was 0.23 deciliter per gram. The glass transition and polymer melting temperatures were 140° and 360°, respectively, as determined by differential scanning calorimetry. Thermogravimetric analysis in air at a heating rate of 150° C./minute showed that decomposition occurred above 410°.

EXAMPLE 3

4-acetoxy-3-methylbenzoic acid (1 part) and magnesium metal (0.0001 part) were charged into a polymerization tube equipped with a gas inlet capillary and a side arm. The reactants were blanketed with nitrogen introduced through the capillary to the bottom of the polymerization tube. The tube was then heated to 230° C. to melt the 4-acetoxy-3-methylbenzoic acid and dissolve the magnesium chip. Acetic acid distilled through the side arm. Heating at this temperature was continued for 40 minutes. The system was finally heated at 230° C. and 0.1 mm. Hg for ½ hour. A polymer having the formula:

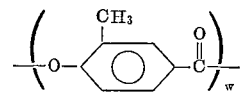

wherein $w$ is an integer of at least 10 was obtained. Thermogravimetric analysis in air at a heating rate of 150° C./minute showed that weight loss began to occur at 310° C. The corresponding value in nitrogen was 430° C.

EXAMPLE 4

3-acetoxy-4-methylbenzoic acid (1 part) and sodium carbonate (0.0001 part) were charged into a polymerization tube equipped with a gas inlet capillary and a side arm. The reactants were blanketed with nitrogen introduced through the capillary to the bottom of the polymerization tube. The tube was then heated to 230° C. to 240° C. to melt the 3-acetoxy-4-methylbenzoic acid and dissolve the sodium carbonate. Acetic acid distilled through the side arm. Heating at the temperature was continued for 3 hours. The system was finally heated at 240° C. and 0.05 mm. Hg for one hour. A polymer having the formula:

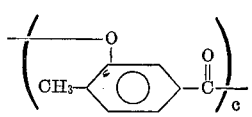

wherein $c$ is an integer of at last 10 was obtained. The polymer was found to be soluble in hot or cold m-cresol, o-chlorophenol and a mixture of tetrachloroethane and phenol.

EXAMPLE 5

4-acetoxy-3,5-dimethylbenzoic acid (5 parts) and magnesium metal (0.0005 part) were charged into a polymerization tube equipped with a gas inlet capillary and a side arm. The reactants were blanketed with nitrogen introduced through the capillary to the bottom of the polymerization tube. The tube was then heated to 235–245° C. to melt the 4-acetoxy-3,5-dimethylbenzoic acid and dissolve the magnesium chip. Acetic acid distilled through the side arm. Heating at the temperature was continued for 2 hours and then gradually raised to 260° C. over a 0.5 hour period. The system was finally heated at 270° C. and 0.2 mm. Hg for ½ hour. A polymer having the formula:

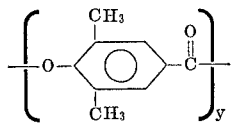

wherein $y$ has a value of at least 10 was obtained. Thermogravimetric analysis in air at a heating rate of 150° C./minute showed that weight loss began to occur at 340° C. The polymer was soluble in hot mixtures of tetrachloroethane and phenol, hot methylchlorophenol and hot chloro-o-phenylphenol.

EXAMPLE 6

4-acetoxy-3,5-diphenylbenzoic acid (5 parts) and magnesium metal (0.0004 part) were charged into a polymerization tube equipped with a gas inlet capillary and a side arm. The reactants were blanketed with nitrogen introduced through the capillary to the bottom of the polymerization tube. The tube was then heated to 240° C. to melt the 4-acetoxy-3,5-diphenylbenzoic acid and dissolve the magnesium chip. Acetic acid distilled through the side arm. Heating at the temperature was continued for 1.5 hours and then gradually raised to 280° C. over a 0.5 hour period. The system was finally heated at 280° C. and 02. mm. Hg for 1.25 hours. A polymer having the formula:

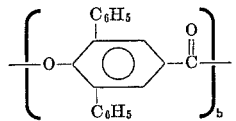

wherein $b$ has a value of at least 10 was obtained. Thermogravimetric analysis in air at a heating rate of 150° C./minute showed that weight loss began to occur at 430° C. The polymer was soluble in hot m-cresol and hot o-chlorophenol.

EXAMPLE 7

4 - acetoxy - 3,5 - dimethylbenzoic and (1.926 parts), 4-acetoxy - 3,5 - diphenylbenzoic acid (3.074 parts) and magnesium metal (0.0001 part) were charged into a polymerization tube equipped with a gas inlet capillary and a side arm. The reactants were blanketed with nitrogen introduced through the capillary to the bottom of the polymerization tube. The tube was then heated to 245° C. to melt the mixture of benzoic acids and dissolve the magnesium chip. Acetic acid distilled through the side arm. Heating at the temperature was continued for one hour and then at 270° C. for ½ hour. The system was finally heated at 280° C. and 0.2 mm. Hg for ½ hour. A copolymer having the formula:

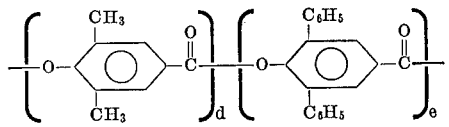

wherein $d$ and $e$ are integers each having a value of at least 5, was obtained. The copolymer was a white, tough solid and was soluble in hot or cold, m-cresol, o-chlorophenol, methylchlorophenol, or a mixture of tetrachloroethane and phenol.

EXAMPLE 8

4-acetoxy - 3,5 - dimethylbenzoic acid (2.241 parts), 4-acetoxy-3-phenylbenzoic acid (2.759 parts) and magnesium metal (0.0001 part) were charged into a polymerization tube equipped with a gas inlet capillary and a side arm. The reactants were blanketed with nitrogen introduced through the capillary to the bottom of the polymerization tube. The tube was then heated to 240° C. to melt the mixture of benzoic acids and dissolve the magnesium chip. Acetic acid distilled through the side arm. Heating at the temperature was continued for 2 hours and then gradually raised to 270° C. over a ¼ hour period. The system was finally heated at 270° C. and 0.2 mm. Hg for ½ hour. A copolymer having the formula:

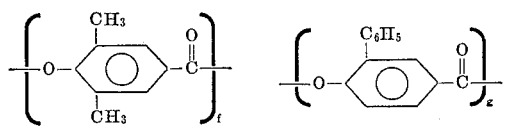

wherein $f$ and $g$ are integers each having a value of at least 5. This copolymer was soluble in hot and cold o-chlorophenol, and a mixture of tetrachloroethane and phenol and soluble in hot m-cresol, methylchlorophenol or chloro-o-phenylphenol.

EXAMPLE 9

4-acetoxy-3-phenylbenzoic acid (2.266 parts), 4-acetoxy-3,5-diphenylbenzoic acid (0.735 part) and magnesium metal (0.0005 part) were charged into a polymerization tube equipped with a gas inlet capillary and a side arm nitrogen was introduced through the capillary to the bottom of the polymerization tube and the tube was heated to 230~240° C. to melt the reactants. The heating was continued for 1.25 hours at this temperature and at 270° C. for 0.75 hour. The system was finally held under a vacuum of 0.1 mm. Hg, and the heating was continued at 270° for one hour and at 290 to 300° C. for one hour. A copolymer having the average composition of the formula:

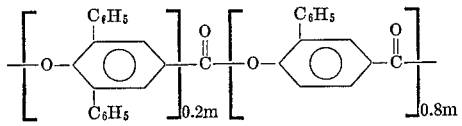

where $m$ is an integer having a value of at least 10 was obtained. The polymer was an opaque, slightly amber-colored, tough solid. Fibers and films can be prepared from the melt. The polymer was soluble in hot cresol, o-chlorophenol and chloro-o-phenylphenol. The intrinsic viscosity of the polymer in chloro-o-phenylphenol at 150° was 0.52 dl./g.

What is claimed is:

1. Film and fiber forming polyesters consisting essentially of recurring units selected from the group consisting of

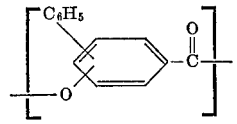

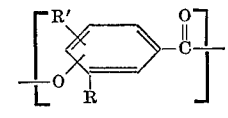

and mixtures thereof, where R and R' are each selected from the group consisting of a lower alkyl group and a lower aryl group.

2. A composition as in claim 1 having the formula:

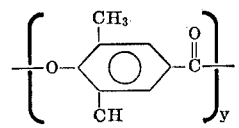

wherein $y$ is an integer of at least 10.

3. A composition as in claim 1 having the formula:

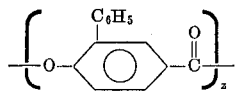

wherein $z$ is an integer of at least 10.

4. A composition as in claim 1 having the formula:

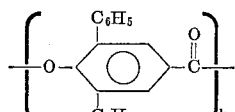

wherein $b$ is an integer of at least 10.

5. A composition as in claim 1 having the formula:

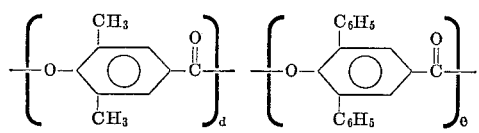

wherein $d$ and $e$ are whole numbers whose sum is at least 10.

6. A composition as in claim 1 having the formula:

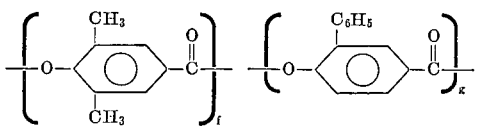

wherein $f$ and $g$ are whole numbers whose sum is at least 10.

7. A composition as in claim 1 having the formula:

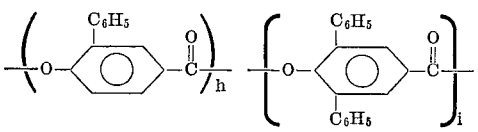

wherein $h$ and $i$ are whole numbers whose sum is at least 10.

References Cited

UNITED STATES PATENTS 2,600,376  6/1952  Caldwell         260—47(C)
3,039,994  6/1962  Gleim            260—47(C)

WILLIAM SHORT, Primary Examiner

L. P. QUAST, Assistant Examiner

U.S. Cl. X.R.

260—33.4, 33.8, 473